United States Patent

Ueda

[11] 4,090,742
[45] May 23, 1978

[54] BEARING DEVICE

[75] Inventor: Iwao Ueda, Izumi, Japan

[73] Assignee: Hamana Iron Works Co., Ltd., Izumi, Japan

[21] Appl. No.: 718,503

[22] Filed: Aug. 30, 1976

[30] Foreign Application Priority Data

Dec. 23, 1975 Japan .............................. 50-154563
May 15, 1976 Japan .............................. 51-055630

[51] Int. Cl.$^2$ .......................... F16C 13/04; F16C 27/00
[52] U.S. Cl. .................................... 308/9; 308/DIG. 1
[58] Field of Search .................... 308/9, DIG. 1, 121; 277/DIG. 5

[56] References Cited

U.S. PATENT DOCUMENTS 3,140,853  7/1964  Lindner ................. 308/DIG. 1
3,169,807  2/1965  Abel et al. ............. 308/DIG. 1

Primary Examiner—Richard A. Bertsch
Attorney, Agent, or Firm—Sughrue, Rothwell, Mion, Zinn and Macpeak

[57] ABSTRACT

A bearing device having a boundary layer of pressurized gas comprises an enclosed member of a box type, which has a semi-cylindrical surface of a semi-circular shape in its transverse cross section. The enclosed member has a plurality of minute holes in the aforesaid semi-cylindrical surface, which holes are directed towards the imaginary center of the aforesaid semi-cylindrical surface, and a pressurized air inlet provided in one wall of the enclosed member. A boundary layer of pressurized air is formed between the semi-cylindrical surface and an outer surface of a rotary shaft mounted thereon due to the injection of air therebetween through a plurality of minute holes defined in the semi-cylindrical surface of the enclosed member. Thus, the rotary shaft is supported by the pressurized air thus introduced, so that the rotary shaft may be rotated in a stable condition, with its center of rotation in coincidence with the imaginary center of the aforesaid semi-cylindrical curved surface.

12 Claims, 16 Drawing Figures

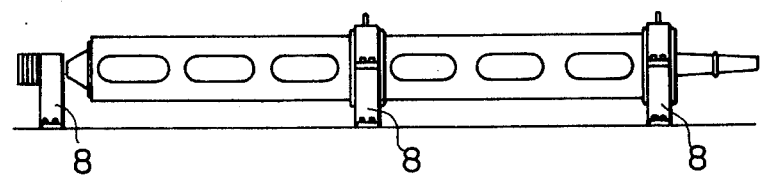
FIG. 1
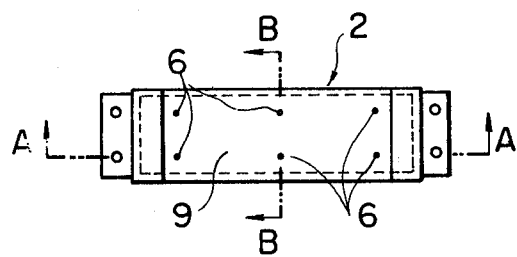
FIG. 2
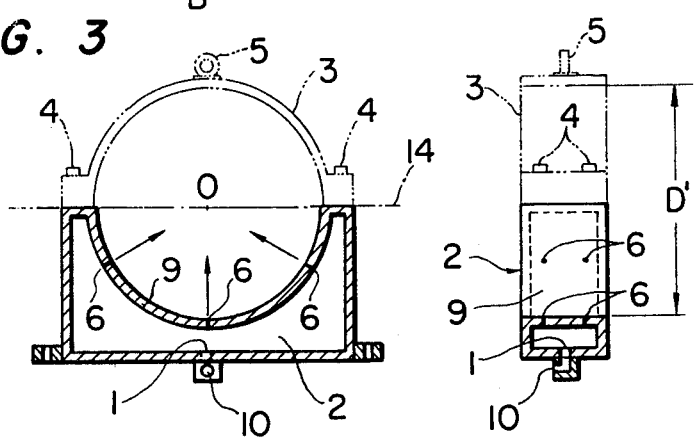
FIG. 3
FIG. 4

FIG. 5
FIG. 6
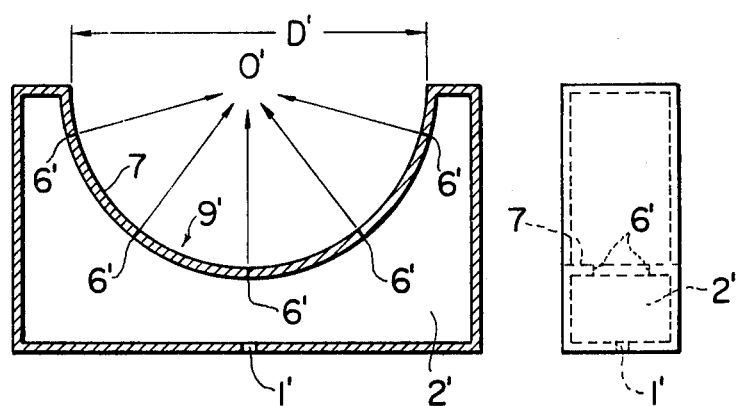
FIG. 7
FIG. 9
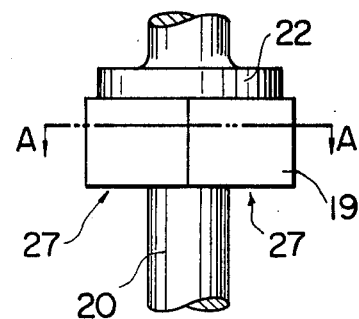
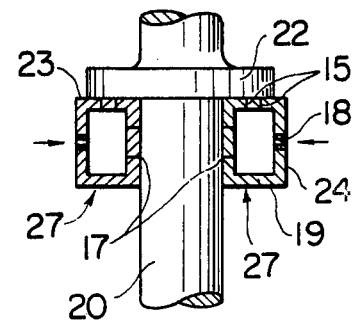
FIG. 8
FIG. 10
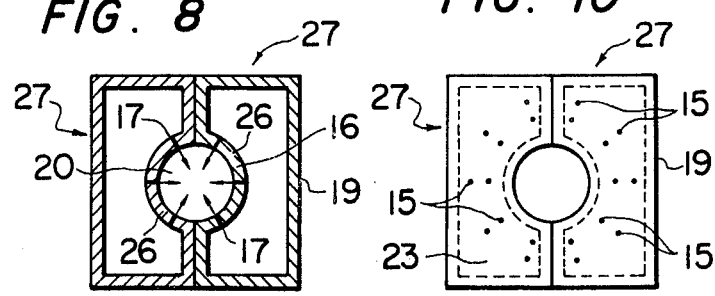

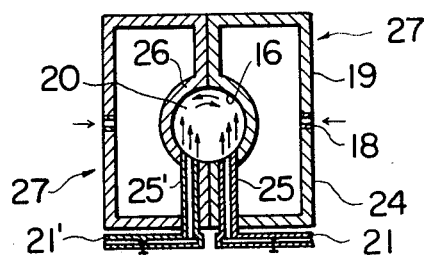
FIG. 11
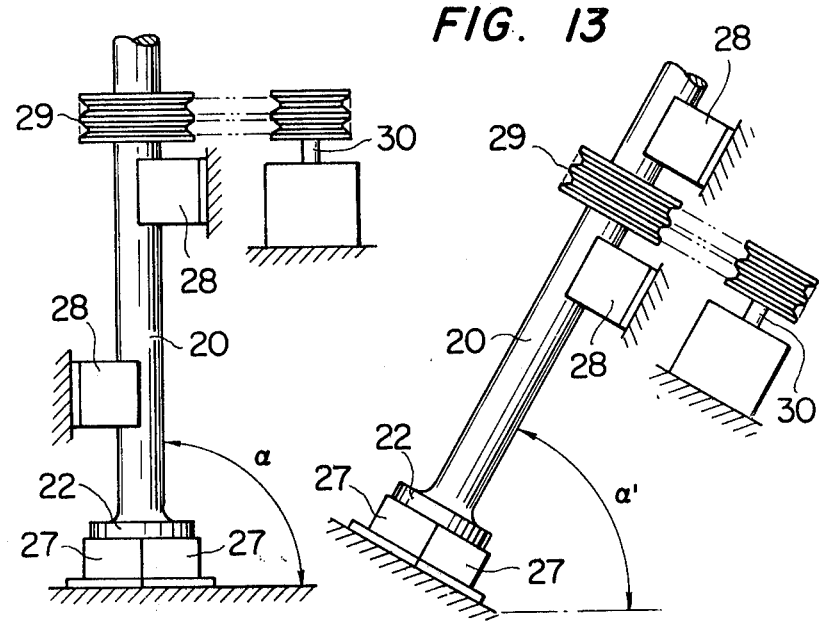
FIG. 12
FIG. 13
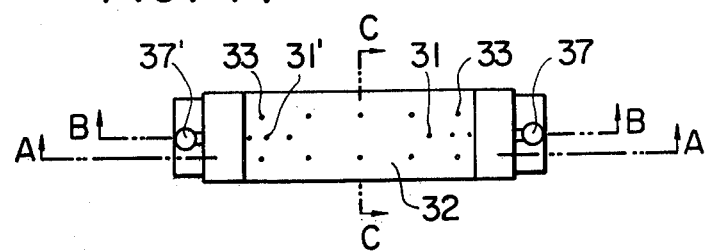
FIG. 14

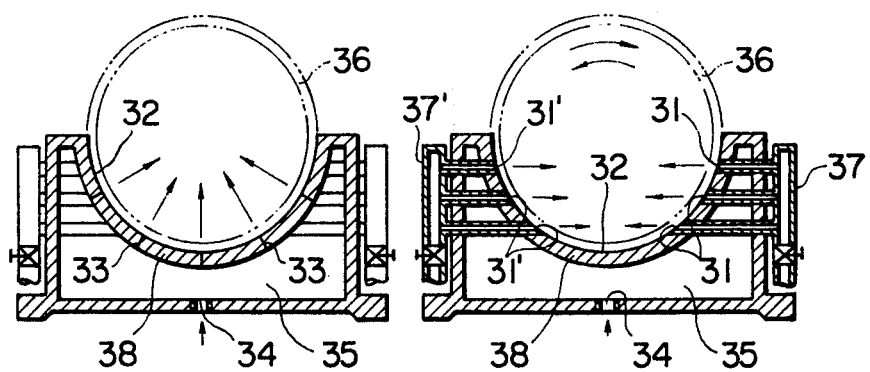

4,090,742

BEARING DEVICE

BACKGROUND OF THE INVENTION

This invention relates to a bearing device of a boundary layer of pressurized air type, which provides a semi-cylindrical surface, on which a rotary shaft may be supported with the aid of pressurized air, and more particularly to a bearing device for use with a main shaft in a wire-twisting machine.

Heretofore, many types of bearings, such as ball bearings, have been used as bearing devices for shafts. However, the prior art bearings cause excessive noise in the case of high speed rotation of a shaft and increased driving power, due to the friction of a bearing portion.

One attempt to eliminate bearing noise is to use a gas type bearing, in which a pressurized gas (e.g. air) is introduced for circulation through a bore provided in a shaft. However, such bearings have suffered from the disadvantages of complexity in construction and high manufacturing cost.

It is also known to provide an annular type bearing using pressurized gas which is injected through the annular surface. If gas is injected through an upper annular member of a bearing, then a pressurized gas should also be injected from below to obtain an equilibrium for a main shaft. A difference between the downward and upward pressures exerted on the main shaft results in a complicated design and construction of a bearing device.

SUMMARY OF THE INVENTION

The present invention is directed to avoiding the aforesaid shortcomings experienced with the prior art bearing devices.

It is accordingly a principal object of the present invention to provide a bearing device of a type having a boundary layer of pressurized air which provides a semi-cylindrical surface and exhibits the merits of a gas or air type bearing device.

It is another object of the present invention to provide a pressurized air type bearing device having a semi-cylindrical surface, which reduces the level of noise, even during high speed rotation of a main shaft.

It is a further object of the present invention to provide a bearing device which minimizes the coefficient of friction in a bearing portion and thereby reduces the power of a drive motor required to rotate a shaft, even in the case where large size bearings are used.

It is a still further object of the present invention to provide a bearing device which is free of generation of heat.

It is a further object of the present invention to provide a bearing device of the type described, which fulfil's the functions required for a horizontal type bearing, a vertical type bearing, and a plain bearing.

It is a further object of the present invention to provide a bearing device, which fulfils the functions required for a radial bearing and a thrust bearing.

It is a further object of the present invention to provide a bearing device, which provides a semi-cylindrical surface and in which a shaft is supported by air for rotation.

It is a further object of the present invention to provide a bearing device for use in a wire-twisting machine for supporting a main shaft thereof.

BRIEF DESCRIPTION OF THE DRAWINGS

FIG. 1 is a side view of a tubular type wire-twisting machine, in which a bearing device of the present invention is used;

FIG. 2 is a plan view of a bearing device according to the present invention;

FIG. 3 is a cross-sectional view taken along the line A—A of FIG. 2;

FIG. 4 is a cross-sectional view taken along the line B—B of FIG. 2;

FIG. 5 is a transverse cross sectional view of a bearing device according to the present invention, which has a semi-cylindrical surface lined with a stainless steel polished sheet;

FIG. 6 is a side view of the bearing device of FIG. 5;

FIG. 7 is a front view of another embodiment of the bearing device according to the present invention, in which a vertical shaft is supported by a combination of two mated bearing members having a semi-cylindrical surface;

FIG. 8 is a cross-sectional view taken along the line A—A of FIG. 7;

FIG. 9 is a longitudinal cross sectional view of FIG. 7;

FIG. 10 is a plan view showing a mated condition of the aforesaid bearing members having a semi-cylindrical surface;

FIG. 11 is a transverse cross sectional view of a mated condition of the aforesaid bearing members having a semi-cylindrical surface, in which a shaft is rotated by using pressurized air;

FIG. 12 and FIG. 13 are front views showing applications of bearing devices used in combination i.e., in a mated conditon and bearing devices used in a single form;

FIG. 14 is a view of an embodiment in which air injection holes are provided in a semi-cylindrical surface of a pressurized air type bearing device according to the present invention, so that a shaft is rotated, being supported by pressurized air which is being injected through the aforesaid holes;

FIG. 15 is a cross-sectional view taken along the line A—A of FIG. 14; and

FIG. 16 is a cross-sectional view taken along the line B—B of FIG. 14.

DETAILED DESCRIPTION OF PREFERRED EMBODIMENTS

FIG. 1 shows a tubular type wire twisting machine, in which a bearing device according to the present invention is used at a bearing portion 8. One example of such a bearing device is shown in FIGS. 2–4. As shown, the bearing device consists of an enclosed member 2 of a box type which has a semi-cylindrical surface 9, in which there are provided a plurality of minute holes 6 directed towards the imaginary center O of the aforesaid semi-cylindrical surface, and a pressurized air inlet 1. The box type member 2 is placed in a horizontal direction. Shown at 3 is an upper cover for a bearing portion, which has a diameter slightly larger than the diameter D of the semi-cylindrical surface 9. Also shown are attaching bolts 4 for use with the upper cover 3, and an air inlet 10 adapted to admit air from an air compressor not shown.

In operation the rotary shaft is mounted on the semi-cylindrical surface 9 of the box type member 2. When air is fed under pressure through a pressurized air inlet 1 into the box type member 2, the air is injected through a plurality of minute holes 6 provided in the semi-cylindrical surface 9 in the direction towards the center of the surface 9. The rotary shaft is slightly lifted or floated off the surface 9 due to the pressure of air thus injected. In other words, there is formed a boundary layer of pressurized air between the semi-cylindrical surface 9 and the outer surface of the rotary shaft. The rotary shaft is supported by the aforesaid boundary layer of pressurized air. It is preferable in this case that the axis of the rotary shaft be in coincidence with the center of the semi-cylindrical surface 9 which is of a semi-circular shape in its transverse cross section. Test results reveal that the thickness of an air layer supporting the rotary shaft is 1/3000 to 1/4000 of the diameter of the rotary shaft. Thus, if a diameter D of the rotary shaft is known then the diameter D' of the semi-cylindrical surface 9 may be determined in a manner to bring the axis of the shaft in coincidence with the center O of the semi-cylindrical surface 9. The diameter D' may be determined in this manner according to the present invention, and the axis of the shaft may be maintained substantially in coincidence with the imaginary center of the semi-cylindrical surface 9.

The plurality of minute holes 6 are provided in the semi-cylindrical surface in the direction towards the center of the surface 9, so that the pressure resulting from air being injected through the minute holes 6 may be uniformly exerted on the shaft towards the axis thereof. This condition is most effective in maintaining the axis of the rotary shaft in a stable condition, during its rotation. The stable rotation of the rotary shaft is closely dependent on the position of the minute holes 6 and the number thereof. According to a preferred example, the diameter of the holes ranges from 0.3 mm to 0.8 mm. In addition, the box type member 2 is of such a configuration that it may function like an air accumulator, so as to permit a supply of air into the bearing device even if the supply of air from the compressor is interrupted.

The semi-cylindrical surface 9 of the bearing device according to the present invention should be preferably maintained in a polished condition. Corrosion should be prevented so as to present the surface from becoming irregular or rough. However it is difficult to polish a semi-cylindrical surface of a bearing device in the case where the diameter of a shaft is over 500 mm. For this reason, a stainless steel sheet and the like which may resist corrosion is used for providing the aforesaid smooth semi-cylindrical surface. FIGS. 5 and 6 show bearing devices having semi-cylindrical surfaces defined by a stainless steel sheet. More particularly, a stainless steel sheet 7 which has been polished is bonded to the rough semi-cylindrical surface of a box type member 2, which rough surface is prepared by means of a lathe. The box type member 2' has a semi-cylindrical surface 9', minute holes 6' and a pressurized air inlet 1', thus providing the same construction as that of the box type member 2. This method provides a semi-cylindrical surface having the same degree of smoothness as that of a surface subjected to polishing. The minute holes 6' are prepared or made, after lining of the stainless steel sheet 7.

Description will be given of an embodiment, in which a boundary layer type bearing device according to the present invention is applied to a vertical type bearing device.

As shown in FIGS. 7 to 10, a plurality of air injection minute holes 17 are provided in the semi-cylindrical surface 16 of a wall 26 of the box type member 19 in the radial direction of a shaft 20 which is in engagement with the aforesaid semi-cylindrical surface 16, while a plurality of thrust air injection holes are provided in the top wall 23 of the box type member, which wall is in engagement with a flange 22 of a shaft 20. The box type member 19 has a pressurized air inlet 18 provided in the other wall 24. Two pressurized air type bearing members 27 consisting of the aforesaid box type members 19 are mated with each other to form a vertical type bearing.

When air is introduced from a compressor (not shown) through the pressurized air inlet 18 into the box type member 19, the air is injected through the thrust air injecting holes 15, and then the flange 22 is lifted or floated by a thrust, due to a boundary layer of pressurized air between the flange 22 and the top wall 23. The flange 22 and hence the shaft 20 are supported in a lifted or floated condition and are thus rotatable. At the same time, air is injected through the air injecting holes 17 in the radial direction of the shaft 20, thereby forming a boundary layer of pressurized air between the outer surface of the shaft 20 and the semi-cylindrical surface 16 of the box type member. The shaft 20 may be supported in a stable condition, and thus rotatable with its axis in coincidence with the center line of the semi-cylindrical surface 16.

The shaft 20 may be rotated by ordinary power or a force of air. FIG. 11 shows an example, wherein branch pipes of pipes 21, 21' pierce through the box type member 19, with air injection holes 25, 25', being opened from the cylindrical surface 16. The direction of the air injection holes 25, 25' is parallel with the imaginary, vertical split surface of the shaft 20. If one of valves on the pipes 21, 21' is closed, while the other valve is opened so as to allow air to be introduced therein, then the shaft 20 is rotated due to the air pressure. If the aforesaid condition of valves are reversed, then the shaft 20 is rotated in the reversed direction. If the ability to rotate the shaft 20 in two directions is not necessary, then the aforesaid pipes can be omitted. Instead air injecting holes 25 or 25' directed in parallel with the aforesaid imaginary vertical split surface of the shaft are directly provided in the aforesaid semicylindrical wall 26.

With the vertical type bearing 27 consisting of two mated box type members 19 equipped with air injecting holes 17, thrust air injecting holes 15, and pressurized air inlet 18, if air injecting holes 25, 25' are provided in both or either one of the box type members 19, then the shaft 20 may be rotated and supported soley by the force of air.

In case the shaft 20 is driven by another drive shaft, there may be used a vertical type bearing device which consists a combination of two mated semicylindrical type bearings 27, 27 and two semi-cylindrical type bearings 28, 28, which are of the same construction as that of a single bearing 27 except that they do not have corresponding thrust air injecting holes 15. FIGS. 12 and 13 show bearing devices of the aforesaid construction.

FIG. 12 shows a vertical type bearing device, consisting of two mated semi-cylindrical, pressurized air type bearings 27, 27, a pulley 29, a pulley and motor 30 connected by a belt to pulley 29, and semi-cylindrical, pressurized air type bearings 28, 28 positioned in staggered relation on the outer surface of the shaft 20 but between the pulley 29 and the bearings 27, 27. FIG. 12 shows a vertical bearing device consisting of two mated semi-cylindrical type bearings 27, 27, a pulley 29 positioned thereabove, a pulley motor 30, and two semi-cylindrical type bearings 28, 28 positioned in parallel on the opposite sides of the pulley 29, respectively. The semi-cylindrical type bearings 28, 28 positioned on one side but in parallel with each other may cope with a reaction acting on the shaft 30 by a force exerted by a drive shaft 30, thereby supporting the shaft 30 in a stable condition.

An angle α formed by the shaft 20 and a horizontal plane, in the vertical type bearing device according to the present invention is not necessarily limited to 90°, as shown in FIG. 12, but may be an acute angle α' as shown in FIG. 13.

The vertical type bearing device consisting of semi-cylindrical type bearings 28, 28 may be used in combination with another type thrust bearing instead of the semi-cylindrical type bearings 27, 27 as in the aforesaid manner. In addition, two bearings 28, 28 may be used in a mated relation, if required.

FIGS. 14 to 16 show another embodiment of a bearing device according to the invention, in which shafts are supported and rotated by air.

Air injecting holes 31 for use in rotating a shaft 36 are directed in parallel with the imaginary longitudinal split plane of the shaft. Air injection in the aforesaid direction may rotate the shaft 36. The air injection holes 31 may be positioned at the exits of branch pipes of a pipe 37, which pipes pierce through the box member 35 and are open from the semi-cylindrical surface 32. Air injecting holes 31' may be provided in the semi-cylindrical surface 32 on the side opposite to the air injecting holes 31, so that the shaft 36 may be rotated in either direction by opening one of the values on pipes 37, 37' and closing the other of the valves. In case rotation of the shaft 36 in only one direction is desired, the air injection holes 31 may be directly provided in the semi-cylindrical surface 32 in parallel with the aforesaid imaginary split plane of the shaft. In this case, the shaft 36 is floated on or lifted by air which is being introduced through pressurized air inlet 34 and then through the holes 33, to the bearing surface, while the shaft 36 may be rotated by air through the holes 31.

The shaft 36 is maintained in floating or lifted condition by the pressurized air through the air injection holes, so that due to the application of air pressure in parallel with the aforesaid imaginary split plane, the shaft may be rotated with ease. Test results proved that the two types of air flow for use in rotating and lifting or floating the shaft, respectively, will not interfere with each other, and the shaft may be rotated at a high R.P.M. in a stable manner.

As an alternative, in case two-semicylindrical type bearings are mated with each other, air injecting holes for supporting the shaft may be provided in one of the bearings while air injecting holes for rotating the shaft may be provided in the other bearing.

The advantages of the bearing device according to the present invention are presented below for comparison with the prior art roll supporting bearing device and the like.

(1) There is little or no noise, even in the case of high speed rotation. An example is shown below:
  Ball bearing supporting device — 90 dB
  Under roller supporting device — 95 dB
  Bearing device according to the invention — 40 dB (2) The coefficient of friction of the bearing device of the invention is extremely small. As a result, even in the case of a large sized bearing device, the power of a drive motor necessary to achieve a given rotation may be reduced. The values of the coefficient of friction are shown below, for comparison.
  Ball bearing supporting device — 0.01 to 0.02
  Under roller supporting device — 0.03 to 0.05
  Bearing device according to the invention — 0.001 to 0.002

(3) There is no generation of heat in the bearing portion.
  Ball bearing supporting device — atmospheric temperature plus 20° to 30° C
  Under roll supporting device — atmospheric temperature plus 10° to 15° C
  Bearing device according to the invention — the same as at atmospheric temperature (4) There is no need for repair, maintenance and lubrication.

(5) The manufacturing cost of the bearing device according to the invention is about half the cost of the prior art ball bearing device.

Although the description above mentions air as the pressurized gas for forming the pressurized boundary layer and for rotating a shaft, it will be apparent that other gasses are equally suitable. In addition, if required, a porous material may be used in place of the semi-cylindrical wall of a box type member, thereby dispensing with the aforesaid plurality of minute holes.

The boundary layer of pressurized air type bearings which are to be used in mated condition according to the present invention are simple to mate and separate, thereby presenting a considerable convenience for the installation and removal of a shaft. In addition, as shown in embodiments of the invention, the bearing device may not only support but also rotate a shaft, thus dispensing with a specific power source of another type.

What is claimed is:

1. A pressurized gas type bearing device for rotationally supporting a shaft, comprising:
  a box type member having a semi-cylindrical wall, side walls and a bottom wall, all defining an enclosed space therein, said semi-cylindrical wall having a plurality of minute holes directed towards the imaginary center of said semi-cylindrical wall which is external to said box type member, a pressurized gas inlet provided in said side walls or bottom wall of said box type member for introducing a gas under pressure into said enclosed space; whereby, due to injection of gas through said minute holes, a boundary layer of pressurized air is formed between the surface of said semi-cylindrical wall and the outer surface of a rotary shaft surrounded at least partially by said semi-cylindrical wall so that said rotary shaft may be supported by the pressurized gas in a stable manner, with the axis of said shaft being in coincidence with the imaginary center of said semi-cylindrical wall surface.

2. A pressurized gas type bearing device as set forth in claim 1, wherein the diameter of said minute holes is in the range of from 0.3 to 0.8 mm.

3. A pressurized gas type bearing device as set forth in claim 1, wherein the thickness of said boundary layer of pressurized gas ranges from 1/3000 to 1/4000 of the diameter of said rotary shaft.

4. A pressurized gas type bearing device as set forth in claim 1, wherein the surface of said semi-cylindrical wall facing said rotary shaft has a stainless steel sheet bonded thereon with minute holes in positions corresponding to said minute holes of said semi-cylindrical wall.

5. A pressurized gas type bearing device as set forth in claim 1, further comprising at least one gas injection hole provided in said semi-cylindrical wall in parallel with said bottom wall of said box type member for injecting a gas in a direction for rotating said shaft.

6. A pressurized gas type bearing device as set forth in claim 1, further comprising at least a pair of gas injection holes provided in said semi-cylindrical wall parallel with said bottom wall and in opposing relation to each other for selectively injecting a gas through one or the other injection holes toward said shaft for selectively rotating said shaft in a first and second direction, respectively.

7. A pressurized gas type bearing device as set forth in claim 6, wherein a pair of valves are provided in communication with said pair of air injection holes positioned in opposing relation to each other, wherein one of said valves is opened and the other is closed, thereby affecting rotation of said shaft either in the said first direction or in the second, reverse direction.

8. A pressurized gas type bearing device as set forth in claim 1, further comprising a semi-cylindrical cover positioned to mate with said semi-cylindrical wall of said box type member thereby forming a cylindrical wall completely surrounding said rotary shaft.

9. A pressurized gas type bearing device as set forth in claim 8 wherein the diameter of said semi-cylindrical cover is slightly larger than the diameter of said semi-cylindrical wall.

10. A pressurized gas type bearing device as set forth in claim 1 further comprising a second box type member substantially identical to said first box type member and mated therewith so that the semi-cylindrical walls of said first and second box type members form a cylindrical wall completely surrounding said rotary shaft.

11. A pressurized gas type bearing device as set forth in claim 10 wherein said box type members and said shaft are positioned in a direction whereby the shaft is more vertical than horizontal, and wherein said shaft has a flange portion at a position just outside said bearing so as to abut one of the side walls of each of said box type members, and wherein said latter side walls have minute holes therein to form a boundary gas layer between said flange and said latter side walls.

12. A pressurized gas type bearing device as set forth in claim 1 wherein said gas is air.

* * * * *